(12) United States Patent
Mcgarey et al.

(10) Patent No.: US 11,433,959 B2
(45) Date of Patent: Sep. 6, 2022

(54) FOUR-WHEELED ARTICULATED STEERING VEHICLE SYSTEM

(71) Applicant: California Institute of Technology, Pasadena, CA (US)

(72) Inventors: Patrick Mcgarey, Pasadena, CA (US); Issa A Nesnas, San Marino, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 204 days.

(21) Appl. No.: 16/994,244

(22) Filed: Aug. 14, 2020

(65) Prior Publication Data
US 2021/0061381 A1 Mar. 4, 2021

Related U.S. Application Data

(60) Provisional application No. 62/892,728, filed on Aug. 28, 2019.

(51) Int. Cl.
*B62D 61/00* (2006.01)
*B60B 15/00* (2006.01)
(Continued)

(52) U.S. Cl.
CPC .............. *B62D 61/00* (2013.01); *B60B 15/00* (2013.01); *B62D 21/02* (2013.01); *B64G 1/16* (2013.01); *B64G 1/648* (2013.01)

(58) Field of Classification Search
CPC ........ B62D 61/00; B62D 21/02; B60B 15/00; B64G 1/16; B64G 1/648
See application file for complete search history.

(56) References Cited

U.S. PATENT DOCUMENTS

| 4,621,562 A | * | 11/1986 | Carr | ..................... B25J 11/0025 180/22 |
| 4,648,853 A | | 3/1987 | Siegfried | |

(Continued)

OTHER PUBLICATIONS

Bares J. E. et al., "Dante II: Technical description, results, and lessons learned," *The International Journal of Robotics Research*, vol. 18, No. 7, pp. 621-649, 1999.

(Continued)

*Primary Examiner* — Toan C To
(74) *Attorney, Agent, or Firm* — Steinfl + Bruno, LLP

(57) ABSTRACT

A four-wheeled articulated steering vehicle for terrain exploration. The four-wheeled articulated steering vehicle has a pair of robotic tethered two-wheel vehicles that dock, lock, and drive long distances as the four-wheeled, articulated steering vehicle. Two actuated docking mechanisms attached on opposite ends of a central module of the four-wheeled vehicle enable "sit/stand" functionality. The "sit" configuration is achieved by aligning each dock mechanism parallel or nearly parallel to the surface, allowing two-wheel vehicle to detach and explore while the other remains docked and serves as a backup. While 'sitting', the central module rests on the ground and is outfitted with shovel-style wedges for passive anchoring. In order to "stand", the exploring two-wheel vehicle reattaches, locks, and both dock mechanisms are rotated until each two-wheel vehicle's caster arm is upright and the central module is lifted off the ground. Once upright, each two-wheel vehicle rotates about a pivot point for articulated, all-wheel steering, which is accomplished by applying differential wheel torques.

19 Claims, 5 Drawing Sheets

(51) Int. Cl.
B64G 1/64 (2006.01)
B64G 1/16 (2006.01)
B62D 21/02 (2006.01)

(56) References Cited

U.S. PATENT DOCUMENTS

| | | | | |
|---|---|---|---|---|
| 4,666,420 | A | * | 5/1987 | Nagano ................... A63H 17/40 446/466 |
| 4,892,503 | A | * | 1/1990 | Kumazawa .......... A63H 17/004 446/460 |
| 5,857,534 | A | * | 1/1999 | DeVault ................... B25J 5/007 901/44 |
| 5,904,218 | A | * | 5/1999 | Watkins ..................... B62J 6/24 180/209 |
| 6,502,657 | B2 | | 1/2003 | Kerrebrock et al. |
| 6,548,982 | B1 | | 4/2003 | Papanikolopoulos et al. |
| 6,860,346 | B2 | | 3/2005 | Burt et al. |
| 7,056,185 | B1 | | 6/2006 | Anagnostou |
| 7,492,116 | B2 | | 2/2009 | Oleynikov et al. |
| 7,559,385 | B1 | | 7/2009 | Burt et al. |
| 7,772,796 | B2 | | 8/2010 | Farritor et al. |
| 8,162,351 | B2 | | 4/2012 | Lee et al. |
| 8,186,469 | B2 | | 5/2012 | Yim et al. |
| 8,197,298 | B2 | | 6/2012 | Willett |
| 8,496,077 | B2 | | 7/2013 | Nesnas et al. |
| 8,720,614 | B2 | | 5/2014 | Nesnas et al. |
| 10,409,277 | B2 | * | 9/2019 | Jacksy ................... B62D 39/00 |
| 2003/0137268 | A1 | | 7/2003 | Papanikolopoulos et al. |
| 2010/0152922 | A1 | | 6/2010 | Carlson et al. |
| 2010/0243357 | A1 | | 9/2010 | Yim et al. |
| 2011/0174565 | A1 | | 7/2011 | Rochat et al. |
| 2012/0185087 | A1 | | 7/2012 | Kang |
| 2020/0369140 | A1 | * | 11/2020 | McCarron .............. B60G 7/001 |

OTHER PUBLICATIONS

Brown T. et al., "Series elastic tether management for rappelling rovers," IEEE/RSJ IROS, 2018.
Cook J. et al., "ISS interface mechanisms and theirheritage," *AIAA Space 2011 Conference & Exposition*, 2011, p. 7150.
Golombek M. et al., "Assessment of Mars Exploration Rover landing site predictions," *Nature*, vol. 436, No. 7047, p. 44, 2005.
Huntsberger T. et al., "Distributed control of multi-robot systems engaged in tightly coupled tasks," *Autonomous Robots*, vol. 17, No. 1, pp. 79-92, 2004.
Huntsberger T. et al., "TRESSA: Teamed robots for exploration and science on steep areas," *Journal of Field Robotics*, vol. 24, No. 11-12, pp. 1015-1031, 2007.
Kerber L. et al., "Moon Diver: A discovery mission concept for understanding the history of the mare basalts through the exploration of a lunar mare pit," *New Views of the Moon2-Asia*, vol. 2070, 2018.
Matthews J. B. et al., "On the design of the Axel and Duaxel rovers for extreme terrain exploration," *IEEE Aerospace Conference*, 2012, pp. 1-10.
McGarey P. et al., "System design of a tethered robotic explorer (TReX) for 3D mapping of steep terrain and harsh environments," *Field and Service Robotics*. Springer, 2015, pp. 267-281.
McGarey P. et al., "Field deployment of the tethered robotic explorer to map extremely steep terrain," *Field and Service Robotics*. Springer, 2018, pp. 303-317.
Meirion-Griffith G. et al., "Accessing Mars recurring slope lineae: Mobility systems analysis," *IEEE Aerospace Conference. IEEE*, 2018, pp. 1-13.
Seegmiller N. et al., "Control of a passively steered rover using 3-d kinematics," *IEEE/RSJ IROS. IEEE*, 2011, pp. 607-612.
Tsai D. et al., "Autonomous vision-based tethered-assisted rover docking," *IEEE/RSJ IROS*, 2013, pp. 2834-2841.
Wagner M. et al., "Design and control of a passively steered, dual axle vehicle," *The Robotics Institute, Carnegie Mellon Universty*, 2005.
Zhang H. et al., "A novel reconfigurable robot for urban search and rescue," *International Journal of Advanced Robotic Systems*, vol. 3, No. 4, p. 48, 2006.
Abad-Manterola P. et al., "A Minimalist Tethered Rover for Exploration of Extreme Planetary Terrains," *IEEE Robotics and Automation Magazine*, vol. 16, No. 4, pp. 44-52, Dec. 2009, 9 pages.
Abad-Manterola P. et al., "Axel Rover Paddle Wheel Design, Efficiency, and Sinkage on Deformable Terrain" *IEEE Conference on Robotics and Automation*,May 2010, 7 pages.
Abad-Manterola P. et al., "Motion Planning on Steep Terrain for the Thethered Axel Rovef" *IEEE Int'l. Conf. on Robotics & Automation, Shanghai Intl. Conf. Center*,May 2011, pp. 4188-4195.
Abad-Manterola P. et al., "Wheel Design and Tension Analysis for the Tethered Axel Rover on Extreme Terrain" *IEEE Aerospace Conference, Big Sky, Montana*,Mar. 2009, 8 pages.
Bauer R. et al., "Experimental and Simulation Results of Wheel-Soil Interaction for Planetary Rovers", *International Conference on Intelligent Robots and Systems*,Aug. 2005, pp. 1-6.
Bauer R. et al., "The Autonomous City Explorer Project: Aims and System Overview",*Proc. of the 2007 IEE/RSJ Int'l Conf. on Intelligent Robots and Systems*,Oct. 2007, pp. 560-565.
Howard A. et al., "A Reconfigurable Robotic Exploratory Vehicle for Navigation on Rough Terrain" *10th Int'l Symp. on Robotics & App*.Jun. 2004, pp. 1-6.
McGarey P. "Towards Articulated Mobility and Efficient Docking for the DuAxel Tethered Robot System" *IEEE Aerospace*,Mar. 2, 2019, pp. 1-9.
Nesnas I. "Axel and DuAxel Rovers for the Sustainable Exploration of Extreme Terrains" *Journal of Field Robotics*,2012, pp. 1-23.
Nesnas I. "Reconfigurable Exploratory Robotic Vehicles" *NASA Tech Briefs*,2001, p. 56.
Nesnas I. "The Axel Marsupial Rover for Challenging Terrain Sampling" *Intl. Symp. on Artificial Intelligence, Robotics and Automation*,2008, pp. 1-9.
Nesnas I.A.D. et al., "Axel Mobility Platform for Steep Terrain Excursions on Planetary Surfaces". *IEEE Aerospace Conference, Big Sky, Montana*,Mar. 2008, 11 pages.
Non-Final Office Action for U.S. Appl. No. 13/096,391, filed Apr. 28, 2011 on behalf of California Institute of Technology dated Jan. 15, 2013 12 pages.
Non-Final Office Action for U.S. Appl. No. 13/926,973, filed Jun. 25, 2013 on behalf of California Institute of Technology dated Nov. 20, 2013 11 pages.
Notice of Allowance for U.S. Appl. No. 13/096,391, filed Apr. 28, 2011 on behalf of California Institute of Technology dated Apr. 2, 2013 6 pages.
Notice of Allowance for U.S. Appl. No. 13/926,973, filed Jun. 25, 2013 on behalf of California Institute of Technology dated Feb. 28, 2014 6 pages.
Restriction Requirement for U.S. Appl. No. 13/096,391, filed Apr. 28, 2011 on behalf of California Institute of Technology dated Oct. 26, 2012 6 pages.
Restriction Requirement for U.S. Appl. No. 13/926,973, filed Jun. 25, 2013 on behalf of California Institute of Technology dated Aug. 30, 2013 8 pages.

* cited by examiner

FOUR-WHEELED ARTICULATED STEERING VEHICLE SYSTEM

CROSS-REFERENCE TO RELATED APPLICATIONS

The present application claims priority to U.S. Provisional Application 62/892,728 filed on Aug. 28, 2019, which is incorporated herein by reference in its entirety.

STATEMENT REGARDING FEDERALLY SPONSORED RESEARCH OR DEVELOPMENT

This invention was made with government support under Grant No. 80NM0018D004 awarded by NASA (JPL). The government has certain rights in the invention.

BACKGROUND

1. Field

The present disclosure relates to robotic vehicles designed to access and explore terrains with extreme topographies. More particularly, the present disclosure relates to apparatus and systems for wheeled, articulated steering vehicles.

2. Description of Related Art

Robotic rovers have been used for the remote exploration of various terrains. Extreme terrains are generally inaccessible to state-of-the art rovers. For example, planetary rovers such as the Mars Exploration Rover or Mars Science Laboratory rover are incapable of providing direct access to some types of topographies that are of keen interest to planetary scientists. Instead, these rovers must rely on gravity and luck to bring samples in the form of fallen debris from steep inaccessible terrain into relatively benign and traversable areas. Scientists must then attempt to identify from which layer (and therefore when in history) the displaced rocks originated. This process is difficult and ultimately less satisfying than seeing strata first hand in an outcrop. In addition, there are other regions in the solar system, such as lava tubes and pit craters, which could only be accessed from the top. Conducting any in-situ science at all at these locales would require tackling slopes approaching vertical.

U.S. Pat. No. 8,496,077, issued Jul. 30, 2013 and U.S. Pat. No. 8,720,614, issued May 13, 2014, and each incorporated herein by reference, describe a robotic two-wheel tethered vehicle that may be used to explore terrains with extreme topographies. Two of the two-wheel vehicles are connected to a central module to provide a robotic four wheel vehicle. Coupling the two-wheel vehicles to the central module allows the two-wheel vehicles to traverse long distances to areas of interest, where the two-wheel vehicles are then deployed from the central module while linked to the central module via a tether. Deployable legs or anchors are used to keep the central module parallel to the ground when a two-wheel vehicle is decoupled from the central module.

In order to explore, the two-wheel vehicle disclosed in U.S. Pat. Nos. 8,496,077 and 8,720,614 starts out at the top of a crater, cliff, or pit with one end of its tether anchored. The two-wheel vehicle manages the tether on board, which can be reeled in/out in order to descend/ascend steep areas while minimizing tether surface drag. Due to a finite, tether-carrying capacity, the two-wheel vehicle is constrained to drive within a circle defined by its tether length and anchor location. Consequently, the two-wheel vehicle must either (i) be placed in proximity of a target and use its lander as a permanent anchor, or (ii) drive untethered and anchor upon arrival. Option (ii) has the advantage of leveraging a parent rover to allow untethered mobility and may be the preferred approach on Mars where the presence of a thin atmosphere implies increased landing site uncertainty.

The two-wheel vehicle disclosed in U.S. Pat. Nos. 8,496,077 and 8,720,614 integrates a pair of hemispherical wheels, a central body with payload bays recessed into each wheel, and a caster arm. The symmetrical design is naturally self righting, and remains mobile regardless of orientation. The tether is managed on a central spool, which can rotate independently, and is let out through the end of the caster arm. The wheels are outfitted with grousers, allowing for high traction on sandy terrain, in place trenching, and navigation over large rocks. The payload bay can rotate while the two-wheel vehicle remains stationary, allowing up to eight instruments/sensors to be deployed in close proximity of the surface with millimeter accuracy.

U.S. Pat. Nos. 8,496,077 and 8,720,614 further disclose a transport vehicle system, which is comprised of two of the two-wheel vehicles docked to a central module. The system enables four-wheeled mobility over moderate terrain, undocking of the two-wheel vehicle for exploring, and passive anchoring. The transport vehicle system disclosed in U.S. Pat. Nos. 8,496,077 and 8,720,614 provides for untethered mobility, anchoring, and even autonomous docking. After determining a location to be explored, an exploring two-wheel vehicle undocks from the transport vehicle system, a kick stand deploys, and the central module, together with a backup two-wheel vehicle, serve as a passive anchor. Upon return, the exploring two-wheel vehicle's caster arm is retracted into the central module by reeling in the tether.

SUMMARY

Described herein are according to embodiments of the present invention that provide a vehicle, mechanism, and method for a four-wheeled articulated terrain exploration system.

A first embodiment is a vehicle for terrain exploration comprising: a central module; a pair of tethered two-wheel vehicles; and a pair of docking mechanisms, wherein each tethered two-wheel vehicle comprises: a pair of hemispherical wheels; a central body coupled to the hemispherical wheels; a caster arm; and a tether line having two ends, wherein a first end of the tether line is coupled to the tethered two-wheel vehicle, and wherein each docking mechanism of the pair of docking mechanisms comprises: a docking structure, having a first end coupled to the central module and a second end having a pair of pivoting pitch rotary joints; and a docking receptacle, wherein the docking receptacle is coupled to the pair of pivoting pitch rotary joints, and wherein the pair of pivoting pitch rotary joints and docking receptacle are configured to allow the docking receptacle to pivot between an orientation perpendicular or nearly perpendicular to a ground surface and an orientation parallel or nearly parallel to the ground surface, and wherein the docking receptacle comprises: a docking tube configured to receive the caster arm from one of the pair of tethered two-wheel vehicles; and a capstan anchor coupled to a second end of the tether line from one of the pair of tethered two-wheel vehicles, and wherein an aft docking mechanism of the pair of docking mechanisms is coupled to an aft end of the central module and is coupled to an aft tethered two-wheel vehicle of the pair of tethered two-wheel vehicles and a forward docking mechanism of the pair of docking mechanisms is coupled to forward end of the central module and is coupled to a forward tethered two-wheel vehicle of the pair of tethered two-wheel vehicles.

Another embodiment is a docking mechanism for coupling a tethered two-wheel vehicle having a caster arm to a mobility system, wherein the docking mechanism comprises: a docking structure comprising: a U-shaped outer bracket having a bracket right arm, a bracket left arm, and a back bracket coupled to a proximal end of the bracket left arm and a proximal end of the bracket right arm; a mounting plate; a roll rotary joint coupling the back bracket to the mounting plate; a first pitch rotary joint coupled to a distal end of the bracket right arm; a second pitch rotary joint coupled to a distal end of the bracket left arm; a U-shaped inner bracket having an upper inner bracket coupled to a proximal end of a first inner bracket arm and coupled to a proximal end of a second inner bracket arm, wherein a distal end of the first inner bracket arm is coupled to the first pitch rotary joint and a distal end of the second inner bracket arm is coupled to the second pitch rotary joint; and a yaw rotary joint disposed on the upper inner bracket, a docking receptacle held in the yaw rotary joint, the docking receptacle comprising: a docking cone; a docking tube configured to hold the caster arm; and, a capstan anchor configured to anchor a tether line from the tethered two-wheel vehicle.

Still another embodiment is a method for providing terrain exploration with a four-wheeled vehicle comprising: a first tethered two-wheel vehicle; a second tethered two-wheel vehicle and a central module, the method comprising: sitting the four-wheeled vehicle near a location of interest, wherein sitting comprises: lowering the central module to a surface by rotating a first docking mechanism holding a caster arm of the first tethered two-wheel vehicle to an orientation parallel or nearly parallel to the surface and by rotating a second docking mechanism holding a caster arm of the second tethered two-wheel vehicle to an orientation parallel or nearly parallel to the surface; anchoring the central module to the surface with passive anchoring apparatus located on a bottom of the central module; detaching the first tethered two-wheel vehicle from the first docking mechanism; and, retaining the second tethered two-wheel vehicle in the second docking mechanism, and standing the four-wheeled vehicle, wherein standing comprises: reattaching the first tethered two-wheel vehicle to the first docking mechanism; locking the first tethered two-wheel vehicle to the first docking mechanism; and, raising the central module from the surface by rotating the first docking mechanism holding the caster arm of the first tethered two-wheel vehicle to an orientation perpendicular or nearly perpendicular to the surface and by rotating the second docking mechanism holding the caster arm of the second tethered two-wheel vehicle to an orientation perpendicular or nearly perpendicular to the surface.

DETAILED DESCRIPTION

Described herein is hybrid mobility system that allows a pair of two-wheel rovers to dock, lock, and drive long distances as a four-wheeled, articulated steering vehicle. The four-wheeled vehicles improves upon the mobility of the transport vehicle system described in U.S. Pat. Nos. 8,496,077 and 8,720,614 by providing a "sit/stand" central module with two actuated docking mechanisms that allow for articulated steering while standing and passive terrain anchoring while sitting. The four-wheeled, articulated steering vehicle may be configured to couple to the two-wheel vehicle described in U.S. Pat. Nos. 8,496,077 and 8,720,614 via the actuated docking mechanisms.

Figure 1:
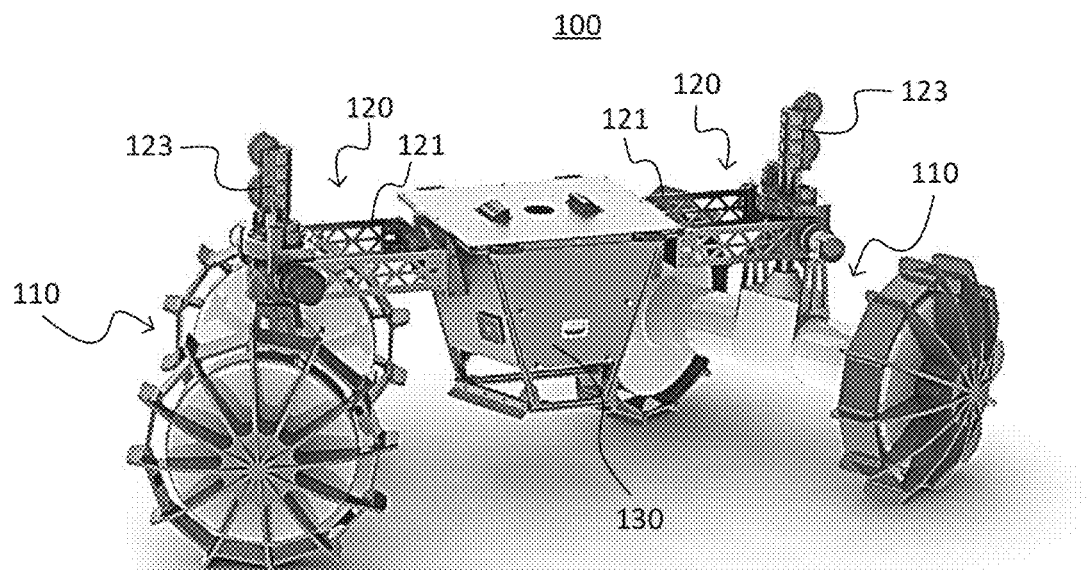
FIG. 1 depicts a four-wheeled articulated steering vehicle.

FIG. 1 depicts the four-wheeled articulated steering vehicle 100 of an embodiment of the hybrid mobility system disclosed herein. As shown in FIG. 1, the four-wheeled vehicle 100 comprises a central module 130, two actuated docking mechanisms 120, and two two-wheel vehicles 110. One actuated docking mechanism 120 is attached to an aft position of the central module 130 and the other actuated docking mechanism is attached to a forward position of the central module 130. One two-wheel vehicle 110 is coupled to the aft actuated docking mechanism 120 and the other two-wheel vehicle 110 is coupled to the forward actuated docking mechanism 120. The actuated docking mechanism 120 comprises a docking structure 121 attached to the central module 120 and a docking receptacle 123 located at the end of the docking structure 121 that is opposite the end of the docking structure 121 that attaches to the central module 130.

Figure 2:
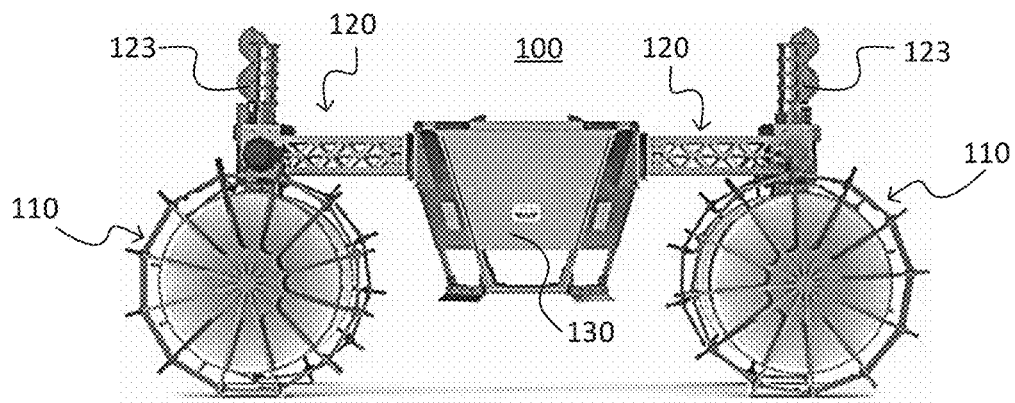
FIG. 2 depicts the four-wheeled articulated steering vehicle in the "stand" position.

FIG. 2 depicts the four-wheeled articulated steering vehicle 100 in the "stand" position. As shown in FIG. 2, the two-wheel vehicles 110 are docked to the actuated docking mechanisms 120. The docking receptacles 123 of the actuated docking mechanisms 120 are rotated into positions that are perpendicular or nearly perpendicular to the surface, i.e., 0 to 15 degrees normal to the surface. In this orientation of the four-wheeled articulated steering vehicle 100, the central module 130 is lifted away from the surface, which allows the vehicle 100 to freely travel.

Figure 3:
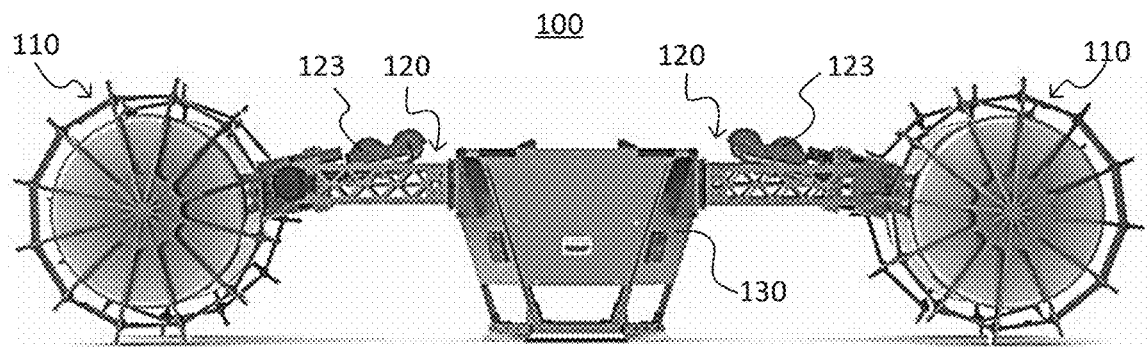
FIG. 3 depicts the four-wheeled articulated steering vehicle in the "sit" position.

FIG. 3 depicts the four-wheeled articulated steering vehicle 100 in the "sit" position. The four-wheeled, articulated steering vehicle 100 achieves the "sit" configuration on a surface by aligning the docking receptacle 123 of each actuated docking mechanism 120 parallel or nearly parallel to the surface, i.e., 0 to 15 degrees with respect to the surface. The "sit" configuration may be obtained by rotating each docking receptacle 123 downward while the wheels of the two-wheel vehicles 110 are driven away from the central module. The "sit" configuration allows one two-wheel vehicle 110 to detach and explore while the other two-wheel vehicle 110 remains docked and serves as a backup. While "sitting", the central module 130 rests on the ground and may be outfitted with wedges for passive anchoring to the terrain.

Figure 4:
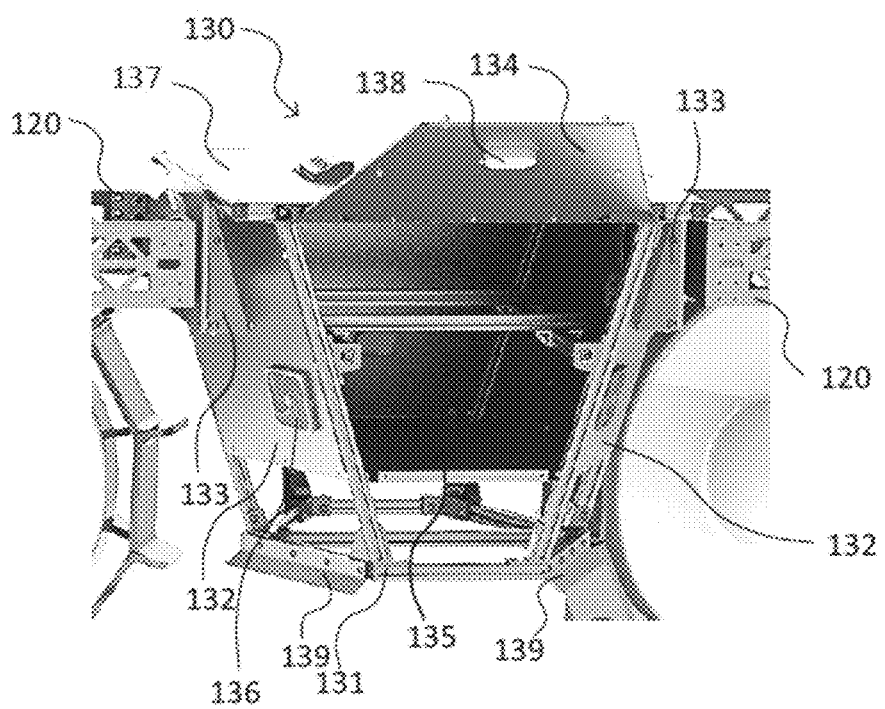
FIG. 4 shows the central module of the four-wheeled articulated steering vehicle.

The central module 130, shown in FIG. 4, comprises a structural frame 131 that couples to each actuated docking mechanism 120 and accommodates power/electronics in an interior compartment 135. FIG. 4 shows the structural frame 131 having a tapered hexagonal shape which is wider at the top and narrower at the bottom. Other central modules may have different shapes. An upper surface 137 may couple to a top-mounted camera mast (not shown in FIG. 4). FIG. 4 shows a passive, shovel-style anchoring system consisting of angled metal plates 139 attached to the bottom portion of the structural frame 131. FIG. 4 shows four angled plates 129 disposed at the bottom of the structural frame 131, but other implementations of passive anchoring system may comprise a different number of plates or plates having different shapes. The passive anchoring system is particularly adapted for anchoring in sandy-type soil. The central module may also include drill (not shown in FIG. 4) for anchoring to rock. The central module 130 may also include cover plates 132 attached to the structural frame 131 for protecting the contents held in the interior compartment 135. One or more of the cover plates may be hinged cover plates 134 to allow easy access to the interior compartment 135. To accommodate the tapered hexagonal shape of the structural frame 131, the cover plates 132, 134 may have trapezoidal shapes. The actuated docking mechanisms 120 attach to the central module 130 via mounting brackets 133 which may be attached to the cover plates 132 and/or the structural frame 131. The cover plates 132, 134 may contain additional features such as fan covers 136 or handles 138.

The design and shape of the central module 120 shown in FIG. 4 result from the following considerations: (1) a body height that allows the docking receptacle 123 to deploy between 0° and 15°; (2) a central module width that fits within the wheel baseline of the two-wheel vehicles 110; (3) a turn radius that is minimized and body storage that is maximized; (4) a actuated docking mechanism 120 length that is minimized for strength; (5) central module cutouts that accommodate yaw and roll freedom for the two-wheel vehicles 110; (6) a base footprint that is stable and resists tipping on the ground; and (7) a base allows for passive anchoring to the terrain. Other central module shapes may also meet some or all of these considerations. The components of the central module 120 may be fabricated from metal or other suitable materials. Light weight metals such as aluminum or light weight composite materials may be chosen for the central module components for weight and strength considerations.

As discussed above, the central module 130 is lowered to the terrain in the "sit" configuration, allowing for passive anchoring. As shown in FIG. 4, anchoring relies on the four angled plates 139 located at the bottom of the structural frame 131. Each pair of plates 139 form a shovel tip that digs downward into the surface as tension is applied on the tether of an exploring two-wheel vehicle. Additional resistance is applied by the wheels of the remaining two-wheel vehicle. In order to detach, the returning two-wheel vehicle docks and both two-wheel vehicles are driven opposite of the anchor support direction until the shovel is no longer submerged. As discussed above, if the terrain is mostly rocky, the central module 120 may be outfitted with an anchoring drill for active anchoring.

Figure 5:
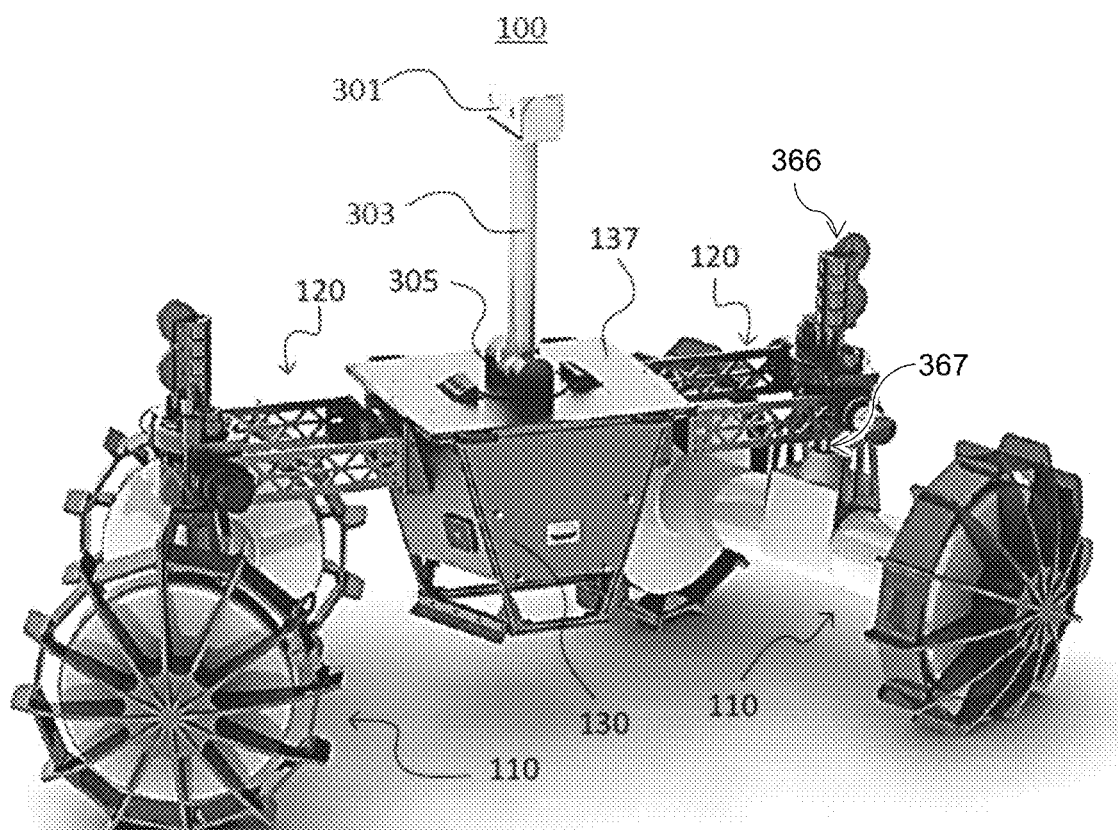
FIG. 5 shows the four-wheeled articulated steering vehicle with a top-mounted camera.

FIG. 5 shows the four-wheeled articulated steering vehicle 100 with a top-mounted camera 301. The top-mounted camera 301 sits on top of a camera mast 303 which is coupled to the top surface 137 of the central module 130 via a camera joint 305. The camera joint 305 may be configured to allow the camera mast 303 to pivot forward or backward or to rotate with respect to the central module 130. This action of the camera joint may provide for close to 360 viewing around the four-wheeled articulated steering vehicle 100.

Figure 6:
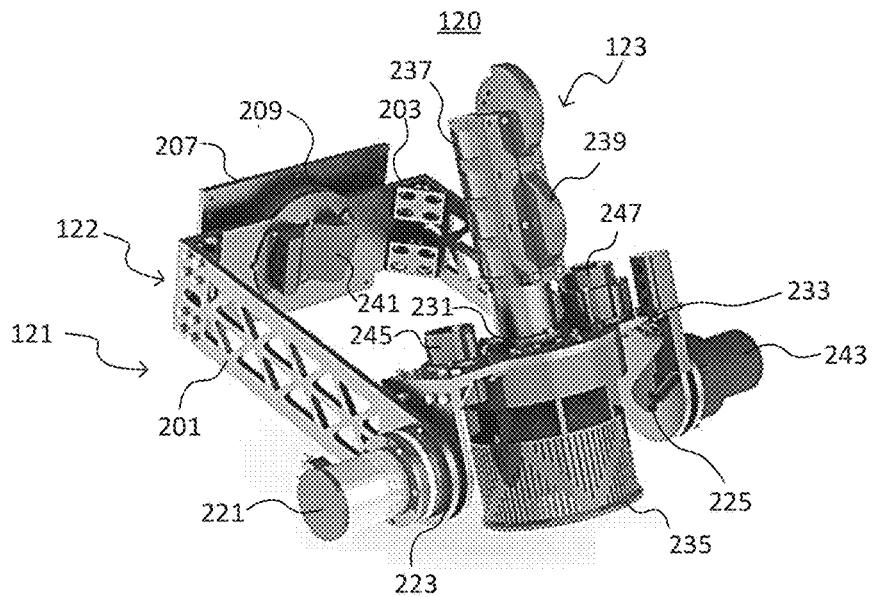
FIG. 6 shows an isometric view of an actuated docking mechanism.
Figure 7:
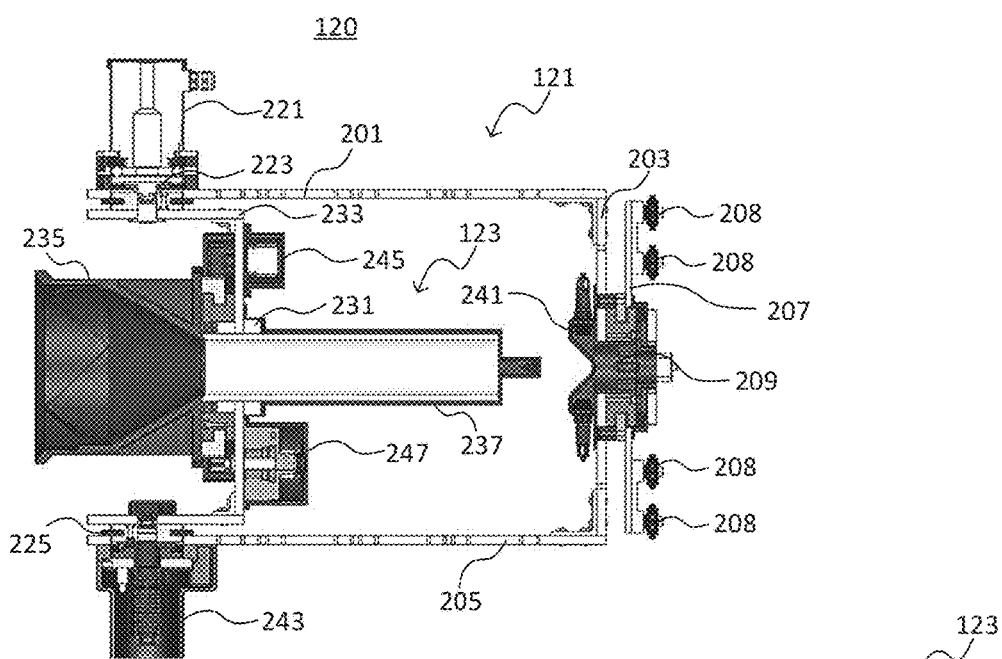
FIG. 7 shows a top view of the actuated docking mechanism.
Figure 8:
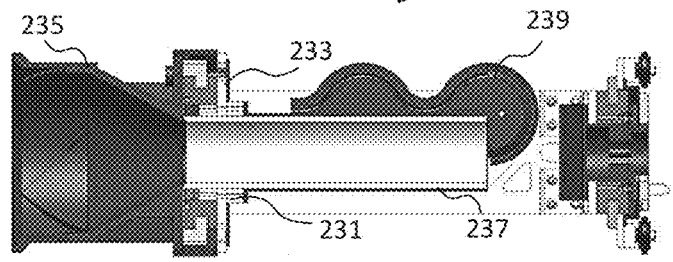
FIG. 8 shows a side view of a docking receptacle that is contained within the actuated docking mechanism.

FIGS. 6, 7, and 8 illustrate the actuated docking mechanism 120. FIG. 6 shows an isometric view of the actuated docking mechanism 120. FIG. 7 shows a top view of the actuated docking mechanism 120. FIG. 8 shows a side view of the docking receptacle 123 that is contained within the actuated docking mechanism 120. As shown in FIGS. 6 and 7, the actuated docking mechanism 120 has a docking structure 121 and a pivotable docking receptacle 123.

The docking structure 121 comprises a U-shaped outer bracket 122 having a bracket right arm 201, a bracket left arm 205, and a bracket back plate 203 that couples to a proximal end of the bracket right arm 201 and a proximal end of the bracket left arm 205 at right angles. The back plate 203 couples to a mounting plate 207 through a roll rotary joint 209. The roll rotary joint 209 allows the U-shaped outer bracket to spin or roll around a central axis defined by the center of the roll rotary joint 209. A roll encoder 241 may be disposed on the back plate 203 to detect the roll angle of the U-shaped outer bracket 122. Mounting fasteners 208 are used to attach the mounting plate 207 to the mounting brackets 133 of the central module 130, described above.

The docking structure further comprises an inner U-shaped bracket 233 disposed between the bracket right arm 201 and bracket left arm 205 at the distal ends of the arms 201, 205 opposite the bracket back plate 203. The inner bracket 233 is coupled to the outer bracket 122 with pitch rotary joints 223, 225. The pitch rotary joints 223, 225 allow the inner bracket 233 to pivot backwards and forwards. The bracket right arm 201 may have an actuator 221 disposed at the pitch rotary joint 223. The actuator has a motor and gear that drives the inner bracket 233 to different positions. A pitch encoder 243 may be disposed at the pitch rotary joint 225 disposed on the bracket left arm 205. The pitch encoder 243 detects the pitch angle of the inner bracket 233. The inner bracket also contains a yaw rotary joint 231 that holds the docking receptacle 123. A yaw encoder 245 may be disposed on the inner bracket 233 to detect the yaw angle of the docking receptacle 123 as it rotates within the yaw rotary joint 231. A brake 253 may also disposed on the inner bracket 233 to limit and control the rotation of the docking receptacle 123 within the yaw rotary joint 231. Brakes may also be disposed on the pitch rotary joints 223, 225 and/or the roll rotary joint 209 to limit and control the rotation of those joints 223, 225, 209.

The docking receptacle 123 is held within the inner bracket 233 by the yaw rotary joint 231. As shown in FIGS. 6, 7, and 8, the docking receptacle comprises a docking cone 235 and a docking tube 237. The interior portion of the docking cone 235 has a tapered interior to guide a caster arm (367 of FIG. 5) of a tethered two-wheel into the docking tube 237. The caster arm of the two-wheel vehicle may have a matching docking cone that locks into place with the docking cone 235 of the docking receptacle 123. A capstan anchor 239 is disposed on the docking receptacle 123 to anchor the tether line (366 of FIG. 5) of the tethered two-wheel vehicle to the docking receptacle. In this configuration, the tether line feeds through the docking tube 237 and is anchored at the capstan anchor 239.

The actuated docking mechanism 120 provides the following functions: (1) actuated pitch control about at the pitch rotary joints 223, 225; (2) passive yaw control through the docking cone 235 with the integrated yaw brake 247; (3) passive roll through the roll rotary joint 209; and (4) tether anchoring using the capstan anchor. The mechanism 120 uses absolute angular encoders 241, 243, 245 at each rotary joint to accurately measure the positional state of the four-wheeled articulated steering vehicle. Note that electrical connections may be routed through the rotary joints 209, 223, 225, 231 without slip rings. Instead, rotational motion may be constrained to limit potential wire damage. The pitch, yaw, and roll rotary joints of the actuating docking mechanism 120 provide for articulation along those three axes, which provides for articulated steering along those three axes at the forward and aft portions of the four-wheel articulated steering vehicle.

Kinematic models may be used to analyze the control of the four-wheeled articulated steering vehicle's driving, sit/stand, anchoring, and docking abilities. The generalized kinematic model described herein is here is a velocity kinematic model relating the six degree-of-freedom velocity of the four-wheeled articulated steering vehicle's chassis frame relative to an inertial frame to each of the platform's joint rates. The model is then constrained to demonstrate the kinematic equations used to steer and drive the two-wheel vehicles in a variety of teleoperation modes. In this description, a vector having the form $^a v_c^b$ describes the position/motion of a frame c relative to frame b expressed in frame a.

Figures 9, 10:
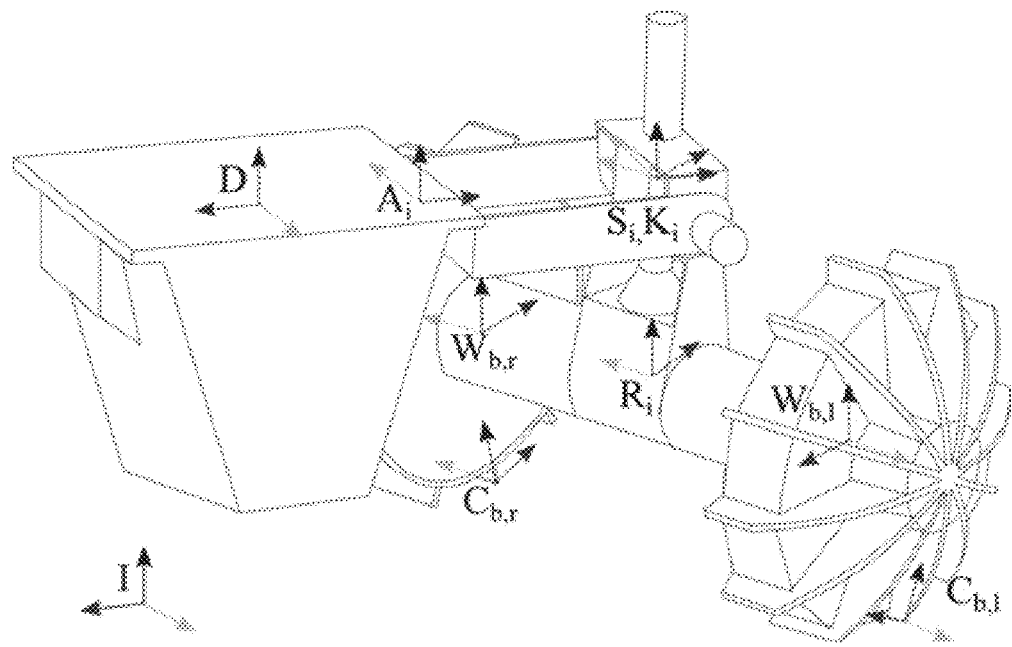
FIG. 9 shows the relevant coordinate frames for describing the kinematic model for the four-wheeled articulated steering vehicle.
FIG. 10 shows a table of the parameters for a kinematic tree of coordinate frames for the kinematic model for the four-wheeled articulated steering vehicle.

The four-wheeled articulated steering vehicle system has a total of eight points of actuation. The relevant coordinate frames for describing the system's kinematic model are shown in FIG. 9. The kinematic tree extending from the rover's inertial frame to each of its wheel ground contact points is described in the table shown in FIG. 10. The table in FIG. 10 lists, for each frame, the parent frame, parent-child translation axis, translation amount, rotation axis and rotation variables. The four-wheeled articulated steering vehicle moves relative to an inertial frame I. The frame aligned with the vehicle's central chassis is the D frame. The vehicle has two symmetric mobility components composed of the actuated docking mechanism and the dockable two-wheel vehicle. The forward-facing docking mechanism relative to the D frame's x-axis is given the enumeration a, while the backward-facing docking mechanism is enumerated as b.

A general expression for a docking mechanism is denoted using i. Each docking mechanism may roll about the D frame's x-axis, at its roll rotary joint $A_i$. The roll rotary joint is passive yet may be constrained via a brake at the joint. The next frame along each docking mechanism is defined by the pitch rotary joint and designated as the knee frame $K_i$. Motion about the y-axis of this frame acts to raise and lower the four-wheeled articulated steering vehicle central module relative to the wheel contact points. Rotation occurs about $K_i$'s y-axis. The origin of the steering frame $S_i$ is collocated with the $K_i$ frame. Rotation about the $S_i$ frame's z-axis acts to steer each two-wheel vehicle. This steering rotation, $q_{S_i}$, may be constrained via a brake. Each two-wheel vehicle mobility module has its own body frame, $R_i$. From the $R_i$ frame, the kinematic tree splits once again, leading to the two wheels. Each branch is enumerated with the sub-script l and r for left and right respectively. A wheel frame is therefore denoted as $W_{i,j}$, where j is either l or r. For example, the front left wheel's coordinate frame is $W_{a,l}$. A second wheel frame $W^*_{i,j}$ is used to describe a frame that rotates with the wheel as it is driven. The last frames are the wheel-ground contact frames $C_{i,j}$. This frame is located at the interface between the wheel surface and the point at which it contacts the terrain surface. The relative rotation between the $C_{i,j}$ frame and the static wheel frame $W_{i,j}$ frame is denoted as the wheel-ground contact angle $\delta_{i,j}$.

For each docking mechanism of the four-wheel vehicle, the generalized kinematic model may be expressed as shown in Eq. 1 below:

$$\varsigma^I_{C_{i,j}} = B \begin{bmatrix} v^I_B \\ \omega^I_B \end{bmatrix} + H_{i,j} \begin{bmatrix} \dot{q}_{A_i} \\ \dot{q}_{S_i} \\ \dot{q}_{K_i} \\ \dot{\delta}_{S_i} \end{bmatrix}, \quad \text{Eq. 1}$$

$$\varsigma^I_{C_{i,j}} = B \varsigma^I_D + H_{i,j} q_{i,j}$$

where $\varsigma^I_{C_{i,j}}$ is the twist of the wheel-ground contact frame relative to the inertial frame, B is the "body" Jacobian that maps the motion of frame D relative to I and $H_{i,j}$ is the docking mechanism to contact Jacobian, which maps the motion of the internal joint articulations to the overall platform motion.

The full velocity kinematic model may therefore be written as shown in Eq. 2 below:

$$\varsigma^I_{C_{i,j}} = \begin{bmatrix} B \\ B \\ B \\ B \end{bmatrix} \varsigma^I_D + \begin{bmatrix} H_{a,l} & 0 & 0 & 0 \\ 0 & H_{a,r} & 0 & 0 \\ 0 & 0 & H_{b,l} & 0 \\ 0 & 0 & 0 & H_{b,r} \end{bmatrix} \begin{bmatrix} q_{a,l} \\ q_{a,r} \\ q_{b,l} \\ q_{b,r} \end{bmatrix}, \quad \text{Eq. 2}$$

$$\varsigma^I_{C_{i,j}} = B_f \varsigma^I_D + Hq$$

The four-wheeled articulated steering vehicle may steer and drive utilizing its two steerable two-wheel vehicles and independently drive each of the four wheels of the two two-wheel vehicles. Expressions for the steering angles $q_{S_i}$ can be developed for each of the two two-wheel vehicles as a function of the body twist $^{BB}\varsigma^B_I = [v_x\ v_y\ 0\ 0\ 0\ \omega]$, as well as expressions for the two-wheel vehicle wheel speed as a function of $^B v^B_I$. To develop these expressions, it is assumed that the motion of the four-wheel vehicle is over flat terrain so that all ground contact angles are $\delta_{i,j}=0$ and that the internal articulation angles are held constant. In this case, it is assumed that $q_{A_i}=0$ and $q_{K_i}=0$.

The steering angles $q_{S_i}$ are a function of the velocity of each of the two-wheel vehicles relative to the inertial frame, expressed in the steering frame, $^{S_i}v^I_{S_i}$. By applying the constraints listed above to the kinematic model in Eq. 2, the following expression for $v^I_{S_i}$ is developed as shown in Eq. 3:

$$v^I_{S_i} = \begin{bmatrix} v_x\cos\psi + v_y\sin\psi \\ -v_x\sin\psi + v_y\psi + (l_1+l_2)\omega \end{bmatrix} \quad \text{Eq. 3}$$

Eq. 3 can then be expressed in the $S_i$ frame as shown in Eq. 4 below:

$$S_{i_{v_{S_i}}^I} = \begin{bmatrix} v_x \\ v_y + (l_1 + l_2)\omega \end{bmatrix} \quad \text{Eq. 4}$$

Each steering angle is a function of this velocity vector as shown in Eqs. 5-7 below:

$$q_{S_i} = \arctan\frac{S_{i_{v_{S_i,x}}^I}}{S_{i_{v_{S_i,y}}^I}} \quad \text{Eq. 5}$$

$$q_{S_1} = \arctan\frac{v_y + (l_1 + l_2)\omega}{v_x} \quad \text{Eq. 6}$$

$$q_{S_2} = \arctan\frac{v_y - (l_1 + l_2)\omega}{v_x} \quad \text{Eq. 7}$$

The angular velocities of each of the wheels, $\dot{q}w_{i,j}$, are also a function of the four-wheeled vehicle body velocities as shown in Eq. 8 below:

$$\dot{q}_{W_{i,j}} = \frac{v_{W_{i,j}}^{R_i}}{l_4} \quad \text{Eq. 8}$$

This leads to the expressions shown below in Eqs. 9-12 for each of the four wheel speeds:

$$\dot{q}_{W_{a,l}} = \frac{\sqrt{v_x^2 + (v_y + \omega(l_1 + l_2))^2} + \omega l_4}{l_5} \quad \text{Eq. 9}$$

$$\dot{q}_{W_{a,r}} = \frac{-\left(\sqrt{v_x^2 + (v_y + \omega(l_1 + l_2))^2} - \omega l_4\right)}{l_5} \quad \text{Eq. 10}$$

$$\dot{q}_{W_{b,l}} = \frac{\sqrt{v_x^2 + (v_y - \omega(l_1 + l_2))^2} + \omega l_4}{l_5} \quad \text{Eq. 11}$$

$$\dot{q}_{W_{b,r}} = \frac{-\left(\sqrt{v_x^2 + (v_y - \omega(l_1 + l_2))^2} - \omega l_4\right)}{l_5} \quad \text{Eq. 12}$$

The sit/stand motion described above may be modeled by expressing the relationship between the $K_i$ frame rotation rate and the wheel $W_{i,j}$ frames rotation rates as shown in Eqs. 13-16 below:

$$\dot{q}_{W_{a,l}} = \frac{l_3 \dot{q}_{K_i} \cos q_{K_a}}{l_5} \quad \text{Eq. 13}$$

$$\dot{q}_{W_{a,r}} = \frac{-l_3 \dot{q}_{K_i} \cos q_{K_a}}{l_5} \quad \text{Eq. 14}$$

$$\dot{q}_{W_{b,l}} = \frac{l_3 \dot{q}_{K_i} \cos q_{K_b}}{l_5} \quad \text{Eq. 15}$$

$$\dot{q}_{W_{a,r}} = \frac{-l_3 \dot{q}_{K_i} \cos q_{K_b}}{l_5} \quad \text{Eq. 16}$$

Figure 11:
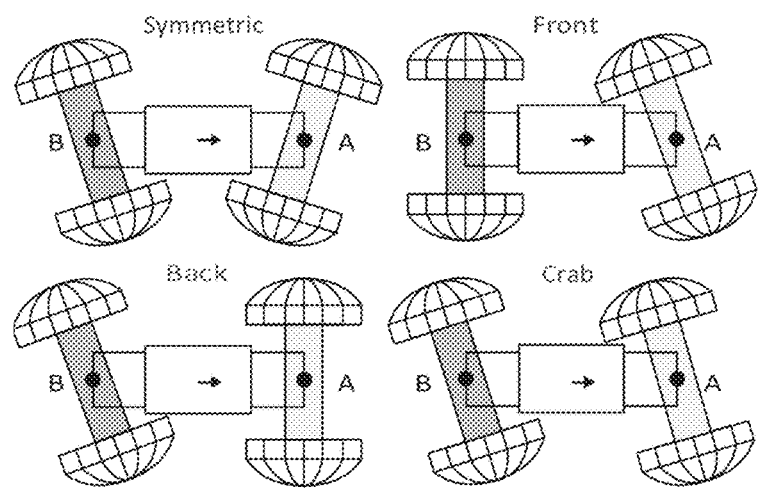
FIG. 11 presents top-down illustrations for four various steering options for the four-wheel articulated steering vehicle.
Figure 12:
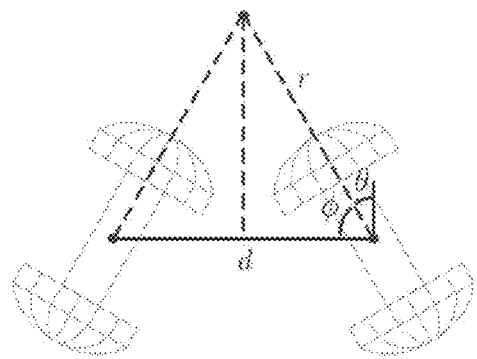
FIG. 12 illustrates the steering rotation of a symmetric steering mode for the four-wheel articulated steering vehicle.

FIG. 11 presents top-down illustrations for four various steering options for the four-wheel articulated steering vehicle: (1) symmetric steering; (2) front steering; (3) back steering; and (4) crab steering. Symmetric steering allows for the tightest turn radius. In symmetric steering, both the front and back two-wheel vehicle pivot around their yaw rotary joint in opposite directions. Front and back steering involves a freely turning two-wheel vehicle that pivots around its yaw rotary joint and one fixed two-wheel vehicle with respect to the central module. For symmetric, front, and back steering, the wheels of the four-wheel vehicle are steered by applying differential wheel torques to rotate about a single pivot point. FIG. 12 illustrates the steering rotation of the symmetric steering mode, where the turning radius r is dependent on the distance between the two-wheel vehicles D and the yaw angles θ, φ of the vehicles, which provides for the tightest turning radius r. Crab steering enforces that both two-wheel vehicles are always aligned parallel to one another while steering, allowing for simple linear trajectory following, which can appear as sideways motion.

Figure 13:
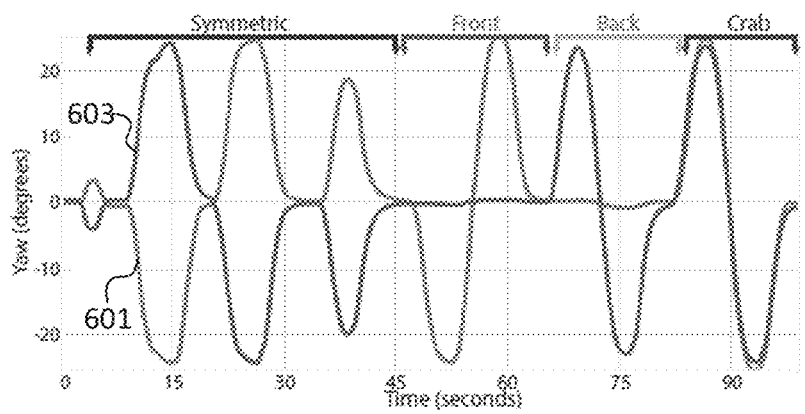
FIG. 13 shows a graph of applying various steering modes to the four-wheel vehicle.

FIG. 13 shows a graph of applying various steering modes to the four-wheel vehicle. For the system producing the date shown in FIG. 13, the distance between the D between the two two-wheel vehicles is 1.8 m. Line 601 shows yaw encoder values for the front two-wheel vehicle while Line 603 shows yaw encoder values for the back two-wheel vehicle as the four-wheel vehicle is cycled through Symmetric, Front, Back and Crab steering modes. Note that steering is limited to 25 degrees in either direction in order to prevent the wheels of the two-wheel vehicles from coming into contact with the central module.

As described above, an actuator may be used to rotate the docking receptacle between the perpendicular orientation to the ground used for the stand mode of the four-wheel vehicle and the parallel or nearly parallel orientation to the ground used for the sit mode. If the actuator is controlled at a constant rotation rate, the rotational velocity of the wheels of the two-wheel vehicle may require a gradual acceleration or deceleration to avoid unwanted wheel drag and excessive torque on the motor-gear coupling within the actuator. Alternatively, rotation of the docking receptacle may be accomplished solely through the use of motion of the wheels of the two-wheel vehicle docked to the docking receptacle. For example, the stand position may be obtained by driving the pair of two-wheel vehicles towards each other, causing the central module to lift off the ground without the aid of a motor in the actuator.

The four-wheeled articulated steering vehicle system disclosed herein provides for enhanced mobility and docking efficiency for a pair extreme terrain two-wheel robotic exploration vehicles. The system uses an articulated docking mechanism that enables sit/stand mobility. In the sit configuration, one two-wheel vehicle can undock and explore while a backup two-wheel vehicle and central module serve as a temporary anchor. In its stand configuration, each two-wheel vehicle can pivot independently for the purpose of articulated steering. The kinematic model for the four-wheeled vehicle shows that four different steering modes can be accomplished in addition to sit/stand functionality.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. It is also to be understood that the terminology used herein is for the purpose of describing particular embodiments only and is not intended to be limiting. Reference to a claim element in the singular is not intended to mean "one and only one" unless explicitly so stated. As used in this specification and the appended claims, the singular forms "a," "an," and "the" include plural referents unless the content clearly dictates otherwise. The term "several" includes two or more referents unless the content clearly dictates otherwise. Unless defined otherwise, all technical and scientific terms used herein have the same meaning as commonly understood by one of ordinary skill in the art to which the disclosure pertains.

Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . "

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A vehicle for terrain exploration comprising:
   a central module;
   a pair of tethered two-wheel vehicles; and
   a pair of docking mechanisms,
   wherein each tethered two-wheel vehicle comprises:
      a pair of hemispherical wheels;
      a central body coupled to the hemispherical wheels;
      a caster arm; and
      a tether line having two ends, wherein a first end of the tether line is coupled to the tethered two-wheel vehicle,
   and wherein each docking mechanism comprises:
      a docking structure, having a first end coupled to the central module and a second end having a pair of pivoting pitch rotary joints; and
      a docking receptacle, wherein the docking receptacle is coupled to the pair of pivoting pitch rotary joints, and wherein the pair of pivoting pitch rotary joints and docking receptacle are configured to allow the docking receptacle to pivot between an orientation perpendicular or nearly perpendicular to a ground surface and an orientation parallel or nearly parallel to the ground surface, and wherein the docking receptacle comprises:
         a docking tube configured to receive the caster arm from one of the pair of tethered two-wheel vehicles; and
         a capstan anchor coupled to a second end of the tether line from one of the pair of tethered two-wheel vehicles, and
      wherein an aft docking mechanism of the pair of docking mechanisms is coupled to an aft end of the central module and is coupled to an aft tethered two-wheel vehicle of the pair of tethered two-wheel vehicles and a forward docking mechanism of the pair of docking mechanisms is coupled to forward end of the central module and is coupled to a forward tethered two-wheel vehicle of the pair of tethered two-wheel vehicles.

2. The vehicle according to claim 1, wherein the vehicle has a stand configuration and a sit configuration, wherein the stand configuration comprises:
   the aft tethered two-wheel vehicle docked into the docking receptacle of the aft docking mechanism;
   the docking receptacle of the aft docking mechanism pivoted to an orientation perpendicular or nearly perpendicular to the ground surface;
   the forward tethered two-wheel vehicle docked into the docking receptacle of the forward docking mechanism; and,
   the docking receptacle of the forward docking mechanism pivoted to an orientation perpendicular or nearly perpendicular to the ground surface,
   whereby the central module is lifted from contact with the ground surface, and
   wherein the sit configuration comprises:
   the docking receptacle of the aft docking mechanism pivoted to an orientation parallel or nearly parallel to the ground surface; and,
   the docking receptacle of the forward docking mechanism pivoted to an orientation parallel or nearly parallel to the ground surface,
   whereby the central module is in contact with the ground surface.

3. The vehicle according to claim 2, wherein each docking mechanism further comprises:
   a roll rotary joint coupling the docking structure to the central module; and
   a roll encoder coupled to the roll rotary joint for detecting a roll angle of the docking structure.

4. The vehicle according to claim 2, wherein each docking mechanism further comprises:
   an inner bracket coupling the docking receptacle to the docking structure;
   a yaw rotary joint coupling the docking receptacle to the inner bracket; and
   a yaw encoder coupled to the yaw rotary joint for detecting a yaw angle of the docking receptacle.

5. The vehicle according to claim 2, wherein each docking mechanism further comprises:
   an actuator coupled to the docking receptacle, wherein the actuator provides force to pivot the docking receptacle between an orientation perpendicular or nearly perpendicular to the ground surface and an orientation parallel or nearly parallel to the ground surface.

6. The vehicle according to claim 2, wherein each docking mechanism further comprises:
   a pitch encoder coupled to at least one of the pitch rotary joints of the pair of pitch rotary joints for detecting a pitch angle of the docking receptacle.

7. The vehicle according to claim 2, wherein the central module comprises:

a structural frame;
an upper surface coupled to a top of the structural frame;
a plurality of side surfaces coupled to side portions of the structural frame; and,
one or more anchor plates coupled to bottom portions of the structural frame.

8. The vehicle according to claim 7, wherein the central module has a tapered hexagonal shape which is wider at the top of the structural frame and narrower at the bottom portions of the structural frame.

9. The vehicle according to claim 7, further comprising:
a camera joint coupled to the upper surface;
a camera mast having a first end coupled to the camera joint; and
a camera coupled to a second end of the camera mast.

10. The vehicle according to claim 4, wherein when the vehicle is in the stand configuration, wheels of the tethered two-wheel vehicles may be controlled to be in one of four steering configurations for steering of the vehicle, wherein the four steering configurations are as follows:
(1) a symmetric configuration wherein the aft two-wheel vehicle and the forward two-wheel vehicle are pivoted in opposite directions;
(2) a front steering configuration wherein the aft two-wheel vehicle is held fixed and the forward two-wheel vehicle pivots;
(3) a back steering configuration wherein the forward two-wheel vehicle is held fixed and the aft two-wheel vehicle pivots; and
(4) a crab steering configuration wherein the aft two-wheel vehicle and the forward two-wheel vehicle are pivoted in parallel directions.

11. A docking mechanism for coupling a tethered two-wheel vehicle having a caster arm to a mobility system, wherein the docking mechanism comprises:
a docking structure comprising:
a U-shaped outer bracket having a bracket right arm, a bracket left arm, and a back bracket coupled to a proximal end of the bracket left arm and a proximal end of the bracket right arm;
a mounting plate;
a roll rotary joint coupling the back bracket to the mounting plate;
a first pitch rotary joint coupled to a distal end of the bracket right arm;
a second pitch rotary joint coupled to a distal end of the bracket left arm;
a U-shaped inner bracket having an upper inner bracket coupled to a proximal end of a first inner bracket arm and coupled to a proximal end of a second inner bracket arm, wherein a distal end of the first inner bracket arm is coupled to the first pitch rotary joint and a distal end of the second inner bracket arm is coupled to the second pitch rotary joint; and
a yaw rotary joint disposed on the upper inner bracket,
a docking receptacle held in the yaw rotary joint, the docking receptacle comprising:
a docking cone;
a docking tube configured to hold the caster arm; and,
a capstan anchor configured to anchor a tether line from the tethered two-wheel vehicle.

12. The docking mechanism according to claim 11, wherein the docking structure further comprises an actuator disposed at the first pitch rotary joint, wherein the actuator provides force to pivot the U-shaped inner bracket around the first and second pitch rotary joint.

13. The docking mechanism according to claim 11, wherein at least one angular encoder is coupled to at least one of the rotary joints.

14. The docking mechanism according to claim 11, wherein at least one brake is coupled to at least one of the rotary joints.

15. A mobility system comprising:
a central module;
an aft tethered two-wheel vehicle coupled to the central module with the docking mechanism according to claim 11; and,
a forward tethered two-wheel vehicle coupled to the central module with the docking mechanism according to claim 11.

16. A method for providing terrain exploration with a four-wheeled vehicle comprising: a first tethered two-wheel vehicle; a second tethered two-wheel vehicle and a central module, the method comprising:
sitting the four-wheeled vehicle near a location of interest, wherein sitting comprises:
lowering the central module to a surface by rotating a first docking mechanism holding a caster arm of the first tethered two-wheel vehicle to an orientation parallel or nearly parallel to the surface and by rotating a second docking mechanism holding a caster arm of the second tethered two-wheel vehicle to an orientation parallel or nearly parallel to the surface;
anchoring the central module to the surface with passive anchoring apparatus located on a bottom of the central module;
detaching the first tethered two-wheel vehicle from the first docking mechanism; and,
retaining the second tethered two-wheel vehicle in the second docking mechanism, and
standing the four-wheeled vehicle, wherein standing comprises:
reattaching the first tethered two-wheel vehicle to the first docking mechanism;
locking the first tethered two-wheel vehicle to the first docking mechanism; and,
raising the central module from the surface by rotating the first docking mechanism holding the caster arm of the first tethered two-wheel vehicle to an orientation perpendicular or nearly perpendicular to the surface and by rotating the second docking mechanism holding the caster arm of the second tethered two-wheel vehicle to an orientation perpendicular or nearly perpendicular to the surface.

17. The method according to claim 16, wherein anchoring the central module further comprises drilling into the surface with a drill coupled to the central module.

18. The method according to claim 16, wherein at least one docking mechanism of the first docking mechanism and the second docking mechanism is configured to provide one or more of the following capabilities:
(1) actuated pitch control over a tethered two-wheel vehicle coupled to the docking mechanism with a pitch rotary joint and pitch actuator disposed on the docking mechanism;
(2) passive yaw control over a tethered two-wheel vehicle coupled to the docking mechanism with a yaw rotary joint disposed on the docking mechanism; and
(3) passive roll control over a tethered two-wheel vehicle coupled to the docking mechanism with a roll rotary joint disposed on the docking mechanism.

19. The method according to claim 18, wherein the four-wheel vehicle has at least one of the following four steering configurations:
- (1) a symmetric configuration wherein the first tethered two-wheel vehicle and the second tethered two-wheel vehicle are pivoted in opposite yaw directions;
- (2) a front steering configuration wherein the first tethered two-wheel vehicle is held fixed and the second tethered two-wheel vehicle pivots in a yaw direction;
- (3) a back steering configuration wherein the second tethered two-wheel vehicle is held fixed and the first tethered two-wheel vehicle pivots in a yaw direction; and
- (4) a crab steering configuration wherein the first tethered two-wheel vehicle and the second tethered two-wheel vehicle are pivoted in parallel yaw directions.

* * * * *